United States Patent
Cui et al.

(10) Patent No.: US 9,657,580 B1
(45) Date of Patent: May 23, 2017

(54) BRAZING TAPE AND METHOD OF FORMING MICROCHANNELS IN A THERMAL BARRIER COATING

(71) Applicant: General Electric Company, Schenectady, NY (US)

(72) Inventors: Yan Cui, Greer, SC (US); Srikanth Chandrudu Kottilingam, Simpsonville, SC (US); Brian Lee Tollison, Honea Path, SC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 15/062,563

(22) Filed: Mar. 7, 2016

(51) Int. Cl.
| | |
|---|---|
| F01D 5/18 | (2006.01) |
| B23K 1/00 | (2006.01) |
| B23K 35/02 | (2006.01) |
| B23K 35/30 | (2006.01) |
| B23K 35/32 | (2006.01) |
| B23K 35/365 | (2006.01) |
| C23C 14/22 | (2006.01) |
| C23C 4/134 | (2016.01) |

(Continued)

(52) U.S. Cl.
CPC ............ *F01D 5/187* (2013.01); *B23K 1/0018* (2013.01); *B23K 35/0233* (2013.01); *B23K 35/3033* (2013.01); *B23K 35/3046* (2013.01); *B23K 35/3053* (2013.01); *B23K 35/327* (2013.01); *B23K 35/365* (2013.01); *C04B 37/026* (2013.01); *C23C 4/134* (2016.01); *C23C 14/221* (2013.01); *F01D 5/288* (2013.01); *F01D 9/041* (2013.01); *F01D 25/12* (2013.01); *C04B 2237/121* (2013.01); *C04B 2237/122* (2013.01); *C04B 2237/123* (2013.01); *C04B 2237/348* (2013.01); *C04B 2237/405* (2013.01); *C04B 2237/64* (2013.01); *F05D 2220/32* (2013.01); *F05D 2230/312* (2013.01); *F05D 2260/202* (2013.01); *F05D 2300/611* (2013.01)

(58) Field of Classification Search
CPC .......... F01D 4/187; F01D 5/288; F01D 9/041; F01D 25/12; C23C 4/134; C23C 14/221; B23K 1/0018; B23K 35/3033; B23K 35/3046; B23K 35/3053; B23K 35/327; B23K 35/365
See application file for complete search history.

(56) References Cited

U.S. PATENT DOCUMENTS

| | | |
|---|---|---|
| 5,640,767 A | 6/1997 | Jackson et al. |
| 6,024,787 A | 2/2000 | Lee |

(Continued)

*Primary Examiner* — Duy Deo
(74) *Attorney, Agent, or Firm* — James W. Pemrick; Ernest G. Cusick; Frank A. Landgraff

(57) ABSTRACT

A method of forming micro channels in a thermal barrier coating includes placing a brazing tape on a substrate. The brazing tape has a first side and a second side with a plurality of ceramic members attached thereto. The first side is placed in contact with the substrate. A brazing step brazes the brazing tape to the substrate. An applying step applies a bond coat to the second side of the brazing tape. Another applying step applies a thermal barrier coating (TBC) onto the bond coat. A removing step removes the plurality of ceramic members by exposing the plurality of ceramic members to a ceramic solvent. A plurality of micro channels are formed in the thermal barrier coating by voids left from the plurality of ceramic members.

12 Claims, 4 Drawing Sheets

(51) Int. Cl.
*F01D 5/28* (2006.01)
*F01D 9/04* (2006.01)
*F01D 25/12* (2006.01)
*C04B 37/02* (2006.01)

(56) References Cited

U.S. PATENT DOCUMENTS

| | | |
|---|---|---|
| 6,210,812 B1 * | 4/2001 | Hasz .................. C22C 38/005 |
| | | 416/241 B |
| 6,321,449 B2 | 11/2001 | Zhao |
| 6,461,107 B1 | 10/2002 | Lee et al. |
| 6,528,118 B2 | 3/2003 | Lee et al. |
| 6,617,003 B1 | 9/2003 | Lee et al. |
| 8,753,071 B2 | 6/2014 | Bunker |
| 2003/0209589 A1 * | 11/2003 | Hasz .................... C23C 26/02 |
| | | 228/165 |
| 2012/0148769 A1 | 6/2012 | Bunker et al. |

* cited by examiner

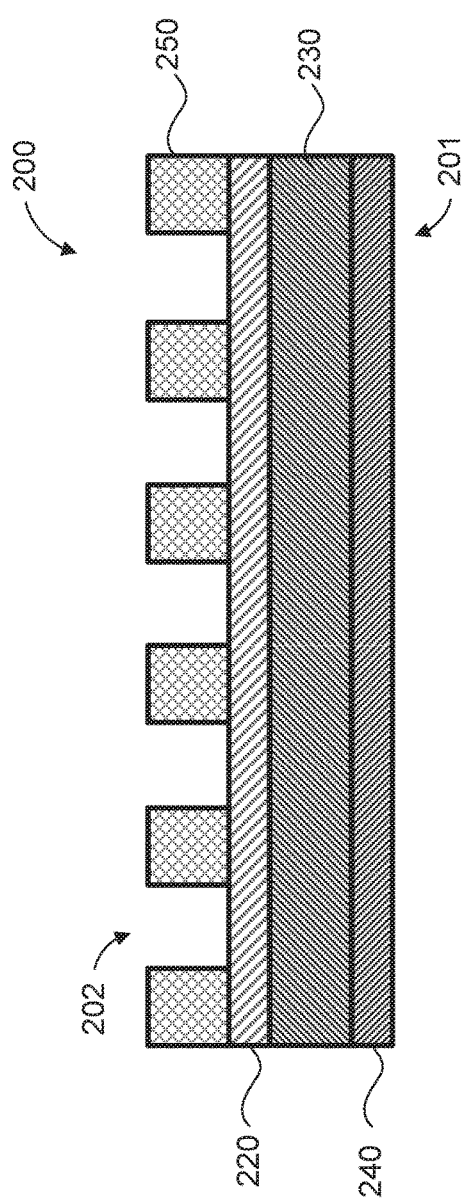
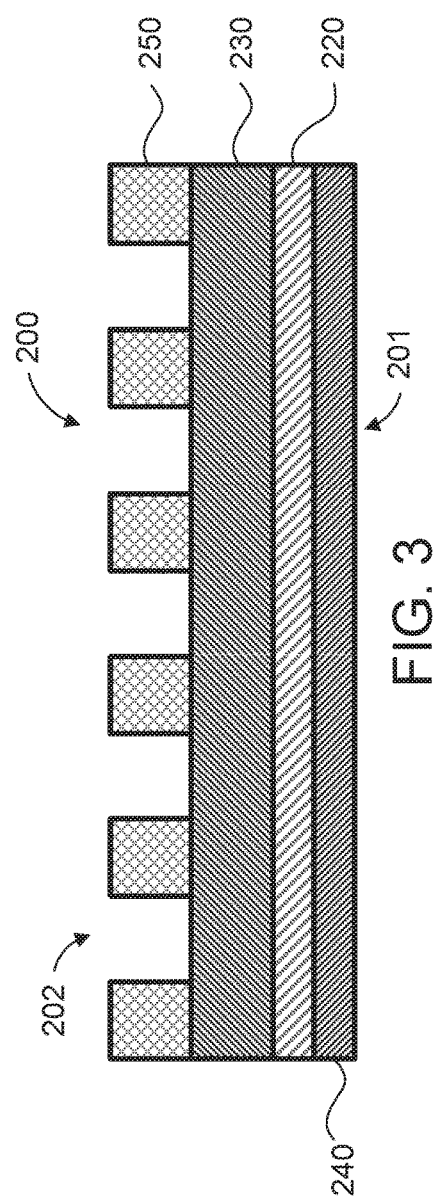

BRAZING TAPE AND METHOD OF FORMING MICROCHANNELS IN A THERMAL BARRIER COATING

BACKGROUND OF THE INVENTION

The method and brazing tape described herein relates generally to thermal barrier coatings. More specifically, the method relates to forming micro channels in a thermal barrier coating with the use of a brazing tape or preform having water-soluble ceramic members.

In gas turbines, air is drawn into and is compressed by a shaft-mounted rotary-type compressor. The compressed air is mixed with fuel in combustors. The mixture is burned, and the hot exhaust gases are passed through a turbine mounted on a shaft. The flow of gas turns the turbine, which turns the shaft/rotor and drives the compressor and fan (for aircraft applications). In land based applications, the turbine may drive a generator. In aircraft applications, the hot exhaust gases flow from the back of the engine, driving it and the aircraft forward.

During operation of gas turbines, the temperatures of combustion gases may exceed 3,000° F., considerably higher than the melting temperatures of the metal parts of the turbine, which are in contact with these gases. Operation of these turbines at gas temperatures that are above the metal part melting temperatures is a well-established art, and depends in part on supplying cooling air to the metal parts through various methods. The metal parts that are particularly subject to high temperatures, and thus require particular attention with respect to cooling, are the metal parts forming combustors and parts located aft of the combustor.

The hotter the turbine inlet gases, the more efficient is the operation of the turbine. There is thus an incentive to raise the turbine inlet gas temperature. However, the maximum temperature of the turbine inlet gases is normally limited by the materials used to fabricate the components downstream of the combustors such as the vanes and the blades of the turbine. In current engines, the turbine vanes and blades are made of nickel-based superalloys, and can operate at temperatures of around 2,100° F.

The metal temperatures can be maintained below melting levels with current cooling techniques by using a combination of improved cooling designs and thermal barrier coatings (TBCs). For example, with regard to the metal blades and vanes employed in gas turbines, some cooling is achieved through convection by providing passages for flow of cooling air from the compressor internally within the blades so that heat may be removed from the metal structure of the blade by the cooling air. Such blades have intricate serpentine passageways within the structural metal forming the cooling circuits of the blade.

Small internal orifices have also been devised to direct this circulating cooling air directly against certain inner surfaces of the airfoil to obtain cooling of the inner surface by impingement of the cooling air against the surface, a process known as impingement cooling. In addition, an array of small holes extending from a hollow core through the blade shell can provide for bleeding cooling air through the blade shell to the outer surface where a film of such air can protect the blade from direct contact with the hot gases passing through the engine, a process known as film cooling.

In another approach, a thermal barrier coating (TBC) is applied to the turbine blade component, which forms an interface between the metallic component and the hot gases of combustion. The TBC includes a ceramic coating that is applied to the external surface of metal parts to impede the transfer of heat from hot combustion gases to the metal parts, thus insulating the component from the hot combustion gas. This permits the combustion gas to be hotter than would otherwise be possible with the particular material and fabrication process of the component.

TBCs include well-known ceramic materials, for example, yttrium-stabilized zirconia (YSZ). Ceramic TBCs usually do not adhere well directly to the superalloys used as substrate materials. Therefore, an additional metallic layer called a bond coat is placed between the substrate and the TBC. The bond coat may be made of a nickel-containing overlay alloy, such as a MCrAlY, where M is an element selected from the group consisting of Ni, Co, Fe and combinations thereof, or other compositions more resistant to environmental damage than the substrate. Alternatively, the bond coat may be a diffusion nickel aluminide or platinum aluminide, which is grown into the surface of the substrate and whose surface oxidizes to form a protective aluminum oxide scale that provides improved adherence of the ceramic top coatings. The bond coat and overlying TBC are frequently referred to as a thermal barrier coating system.

BRIEF DESCRIPTION OF THE INVENTION

In an aspect of the present invention, a method of forming micro channels in a thermal barrier coating includes placing a brazing tape on a substrate. The brazing tape has a first side and a second side with a plurality of ceramic members attached thereto. The first side is placed in contact with the substrate. A brazing step brazes the brazing tape to the substrate. An applying step applies a bond coat to the second side of the brazing tape. Another applying step applies a thermal barrier coating (TBC) onto the bond coat. A removing step removes the plurality of ceramic members by exposing the plurality of ceramic members to a ceramic solvent. A plurality of micro channels are formed in the thermal barrier coating by voids left from the plurality of ceramic members.

In another aspect of the present invention, a method of forming micro channels in a thermal barrier coating is provided. A placing step places a brazing preform on a substrate, and the brazing preform has a first side and a second side with a plurality of water-soluble ceramic members attached thereto, the first side is placed in contact with the substrate. A brazing step brazes the brazing tape to the substrate. An applying step applies a bond coat to the brazing tape. Another applying step applies a thermal barrier coating (TBC) onto the bond coat. A removing step removes the plurality of water-soluble ceramic members by exposing the plurality of water-soluble ceramic members to water. A plurality of micro channels are formed in the thermal barrier coating by voids left from the plurality of water-soluble ceramic members.

In yet another aspect of the present invention, a brazing tape or preform includes a layer comprised of a brazing material, and a plurality of ceramic members are affixed to the layer. The plurality of ceramic members are configured to be removable by a ceramic solvent. The ceramic members may be water-soluble ceramic members, and in this case the ceramic solvent is water. The brazing material may be nickel, nickel alloys, cobalt, cobalt alloys, iron, iron alloys, and combinations thereof. The ceramic members may be about 60% to about 70% by weight of alumina (Al2O3), about 15% to about 25% by weight of zircon (ZrSiO4) flour, about 5% to about 15% by weight of sodium hydrogen phosphate (Na2HPO4), and about 5% by weight of sugar. The layer may also be configured as a flexible tape.

BRIEF DESCRIPTION OF THE DRAWINGS

FIG. 2 illustrates a cross-sectional view of a brazing tape, according to an aspect of the present invention.

FIG. 3 illustrates a cross-sectional view of a brazing tape, according to an aspect of the present invention.

DETAILED DESCRIPTION OF THE INVENTION

One or more specific aspects/embodiments of the present invention will be described below. In an effort to provide a concise description of these aspects/embodiments, all features of an actual implementation may not be described in the specification. It should be appreciated that in the development of any such actual implementation, as in any engineering or design project, numerous implementation-specific decisions must be made to achieve the developers' specific goals, such as compliance with machine-related, system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," and "the" are intended to mean that there are one or more of the elements. The terms "comprising," "consisting," "including," and "having" are intended to be inclusive and mean that there may be additional elements other than the listed elements. Any examples of operating parameters, material constituents and/or environmental conditions are not exclusive of other parameters, constituents or conditions of the disclosed embodiments. Additionally, it should be understood that references to "one embodiment", "one aspect" or "an embodiment" or "an aspect" of the present invention are not intended to be interpreted as excluding the existence of additional embodiments or aspects that also incorporate the recited features.

Figure 1:
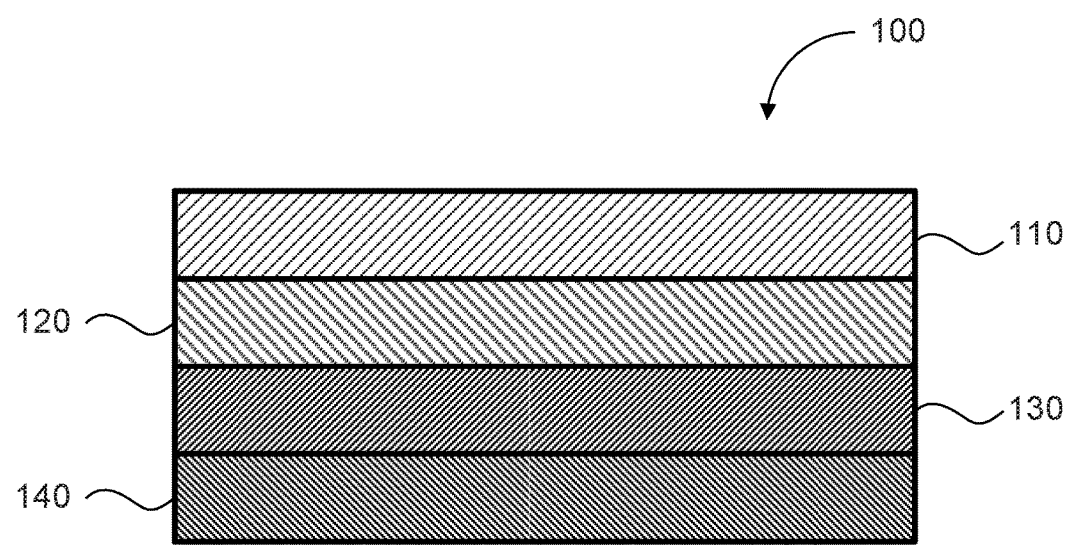
FIG. 1 is a cross-sectional view of one known brazing tape.

FIG. 1 is a cross-sectional view of one known brazing tape 100. The brazing tape 100 consists of four layers. A protective layer 110 is paper, and it protects an adhesive layer 120. The adhesive layer 120 is a pressure-sensitive adhesive that is used to adhere the tape to a substrate. Typically, this adhesive layer 120 decomposes without leaving a residue during a brazing operation. A filler metal layer 130 is a braze material, such as a powdered filler metal mixed with organic binders. A carrier layer 140 carries the filler metal layer 130 until the actual application onto a substrate takes place. An advantage to using a brazing tape is that brazing tapes have excellent uniformity in thickness and are usually easy to apply.

FIG. 2 illustrates a cross-sectional view of a brazing tape/preform 200, according to an aspect of the present invention. The tape 200 has a first side 201 and a second side 202. A plurality of ceramic members 250 are attached to a filler metal layer 230, via optional adhesive layer 220. The adhesive layer 220 is configured to decompose without leaving a residue during brazing. After brazing the ceramic members 250 will be attached to the filler metal layer 230. However, ceramic members 250 may be attached directly to filler metal layer 230 without any intervening layers. An optional carrier layer 240 may be attached to the filler metal layer 230, and the carrier layer carries or supports the filler metal layer 230 until application of the tape 200 onto a substrate (not shown in FIG. 2). Brazing tapes may include more or less layers than shown in FIG. 2, as desired for the specific application.

The ceramic members 250 may be comprised of a water soluble ceramic material containing about 60% to about 70% by weight of alumina ($Al_2O_3$), about 15% to about 25% by weight of zircon ($ZrSiO_4$) flour, about 5% to about 15% by weight of sodium hydrogen phosphate ($Na_2HPO_4$), and about 5% by weight of sugar. A water soluble ceramic is described in U.S. Pat. No. 6,024,787, which is incorporated herein by reference. Other water-soluble ceramic materials/compositions may be used as well, and the advantage of a water soluble material is that water can be used to remove or dissolve the ceramic members 250. Other ceramic solvents could be used to remove water soluble or non-water soluble ceramic members, but water is a preferred option as it is environmentally friendly, widely available and relatively inexpensive.

FIG. 3 illustrates a cross-sectional view of a brazing tape/preform 200, according to an aspect of the present invention. The plurality of ceramic members 250 are attached directly to a second (e.g., the top) side of the filler metal layer 230. The optional adhesive layer 220 and carrier layer 240 are attached to a first (e.g., the bottom) side of the filler metal layer 230. In use, the carrier layer 240 will be peeled off prior to application of the brazing tape 200 onto a substrate. Alternatively, the brazing tape may comprise only the filler metal layer 230 and the ceramic member layer 250. The brazing tape 200 may be configured as a flexible tape, a preform, or a pre-sintered preform (PSP) having any of a variety of shapes. A flexible tape can be easily unrolled, cut and shaped around the part (i.e., substrate). A preform may have a predetermined shape (e.g., a cylinder, rectangle, etc.) or any other pre-formed shape that configures to the portion of the part to be brazed or coated with a thermal barrier coating.

The filler metal layer 230 may be comprised of any suitable brazing material. Non-limiting example materials are nickel, nickel alloys, cobalt, cobalt alloys, iron, iron alloys, and combinations thereof. A few specific examples of filler metals are, BNi-2, BNi-9 and DF-4B, however, any suitable brazing material may be used as required for the specific application and substrate.

Figure 4:
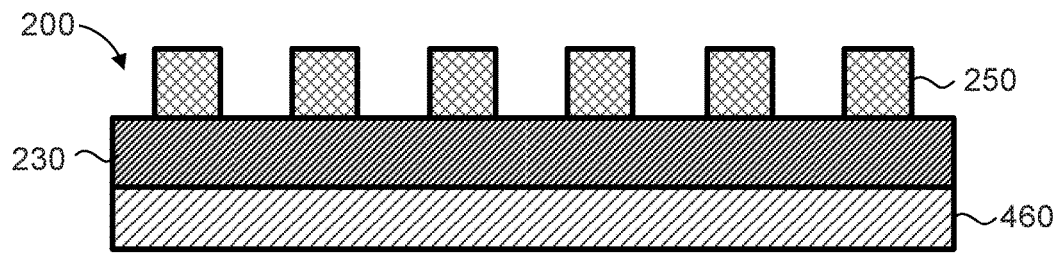
FIG. 4 illustrates a cross sectional view of a machine part, and also illustrates a first step in a method of forming micro channels in a thermal barrier coating, according to an aspect of the present invention.

FIG. 4 illustrates a cross sectional view of a machine part, and first step in a method of forming micro channels 790 in a thermal barrier coating 680. In a placing step, the brazing tape 200 is placed on a substrate 460. A first side (e.g., the bottom side) of the brazing tape is placed in contact with the substrate. The first side may or may not include an adhesive layer, depending on what is desired for the specific application. A second side (e.g., the top side) of the brazing tape has a plurality of ceramic members 250 attached thereto and faces away from the substrate 460. The substrate 460 may be a turbomachine part, such as a blade, nozzle, shroud, transition piece, or any other machine part that would benefit from a thermal barrier coating. Substrate materials may include superalloys, nickel-based superalloys, cobalt-based superalloys, or any material used in high-temperature environments that may benefit from thermal barrier coatings. A brazing step may be used to braze the tape (i.e., filler metal layer 230) to the substrate.

Figure 5:
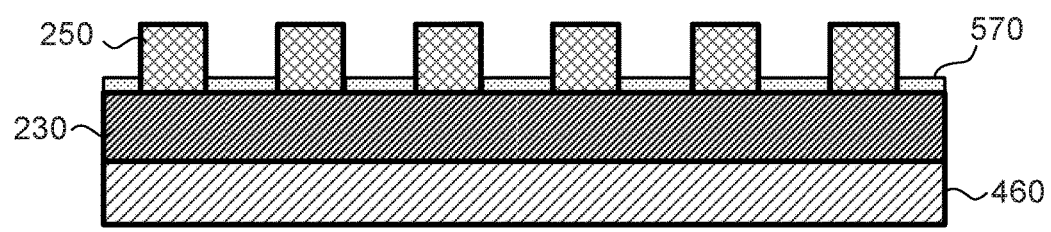
FIG. 5 illustrates a cross sectional view of a machine part, and also illustrates a step where a bond coat is applied to the second side of the brazing tape/preform, according to an aspect of the present invention.

FIG. 5 illustrates another step where a bond coat is applied to the second side of the brazing tape or surface. For example, the bond coat may be sprayed or deposited using known techniques (e.g., physical vapor deposition, electron beam evaporation, ion-plasma evaporation, sputtering, plasma spray, high-velocity oxygen fuel, etc.) to a thickness from about 0.0005 inches to about 0.005 inches, and preferably about 0.002 inches. However, any suitable thickness may be used as desired in the specific application. Bond coat 570 is applied to the second side of the brazing tape 200 (i.e., the top of filler metal layer 230) and optionally the ceramic members 250. Depending on the application, bond coat 570 can be applied to either the filler metal layer 230 only, or both the filler metal layer and the ceramic members 250. The bond coat may be comprised of aluminide, platinum aluminide (PtAl), cobalt-cermet, NiAl, MCrAlY, nickel alloys, nickel-chromium, cobalt alloys, aluminum alloys, and combinations thereof.

Figure 6:
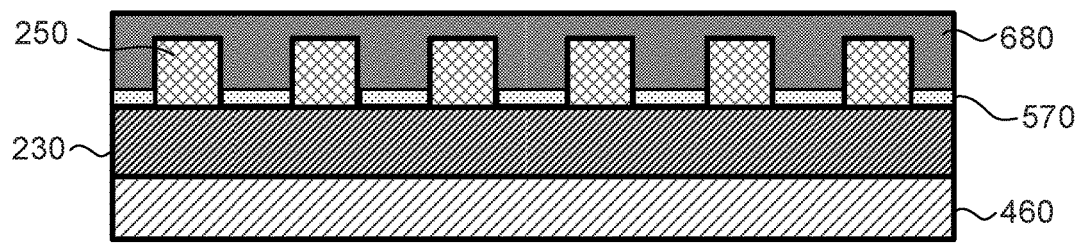
FIG. 6 illustrates a cross sectional view of a machine part, and also illustrates a thermal barrier coating step, according to an aspect of the present invention.

FIG. 6 illustrates a thermal barrier coating step. The thermal barrier coating (TBC) 680 is applied onto the bond coat 570 and the ceramic members 250, using known techniques. For example, the TBC layer 680 may be deposited by electron beam physical vapor deposition (EB-PVD) to a thickness of about 0.001 inches to about 0.05 inches, and preferably about 0.002 inches. However, any suitable thickness may be used as desired in the specific application. The thermal barrier coating may be comprised of a refractory-oxide ceramic, $ZrO_2$, yttrium-stabilized zirconia (YSZ), and combinations thereof, or any other suitable TBC material.

Figure 7:
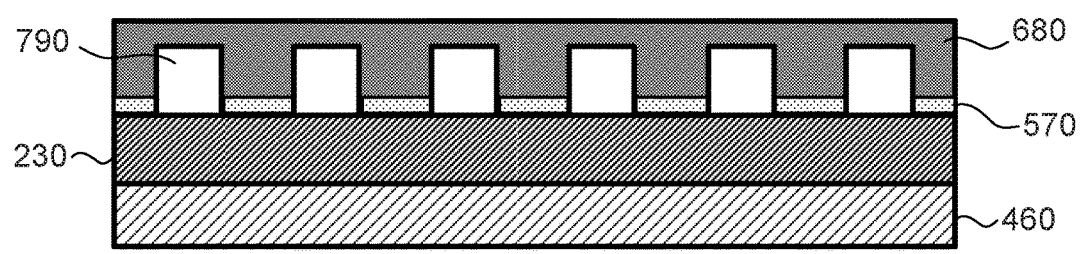
FIG. 7 illustrates a cross sectional view of a machine part, and also illustrates the removal step where a ceramic solvent is used to dissolve or remove the ceramic members to form micro channels, according to an aspect of the present invention.

FIG. 7 illustrates the removal step where a ceramic solvent is used to dissolve or remove the ceramic members 250 to form micro channels 790. Micro channels 790 may be about 0.015 inches to about 0.080 inches diameter, height or width, and may have a rectangular cross section as shown or any other suitable cross section (e.g., circular, oval, polygonal, triangular, etc.). As one preferred example only, micro channels 790 may be about 0.020 inches to about 0.060 inches square. In the example of water-soluble ceramic members 250, water is used to remove the ceramic members 250. The machine part or component (i.e., the substrate 460 and brazing tape 200) is exposed or immersed in water until the ceramic members 250 are removed. The machine part or component may be submerged in a water bath, or water may be circulated through the micro channels 790. The voids left by the removed ceramic members 250 form the micro channels 790. Micro channels 790 provide both active and transpiration cooling through the porous TBC layer 680. The micro channels 790 may be placed to communicate directly with a cooling circuit contained within the machine part. The cooling circuit may be routed through the substrate (e.g., a machine part/component) thereby providing direct and efficient cooling for the machine part and TBC layer 680. The micro channels 790 result in the substrate 460 and TBC layer 680 having an actively cooled flow path region that reduces the cooling requirement for the machine part or component. Therefore, in a turbomachine application, the turbomachine can run at a higher firing temperature without the need for additional cooling air, achieving a better and more efficient turbomachine performance.

Figure 8:
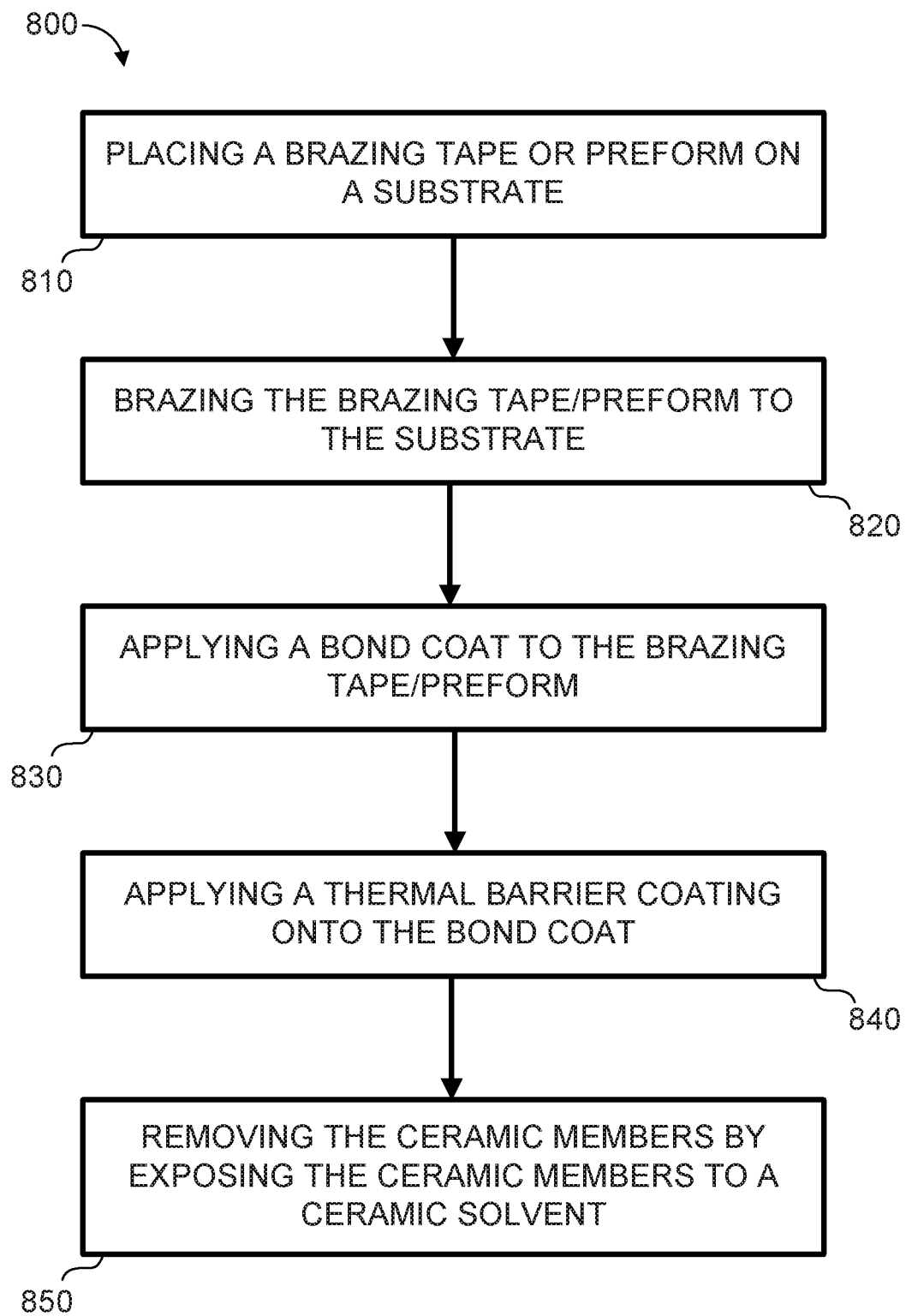
FIG. 8 is a flowchart of a method of forming micro channels in a thermal barrier coating, according to an aspect of the present invention.

FIG. 8 is a flowchart of a method 800 of forming micro channels 790 in a thermal barrier coating 680. The placing step 810 places a brazing tape or preform on a substrate 460. The substrate 460 is typically a machine part that would benefit from having a thermal barrier coating. A brazing step 820 brazes the brazing tape/preform to the substrate 460. Brazing is a metal joining process in which two or more metal items are joined together by melting and flowing a filler metal into the joint or space between the filler metal and substrate 460. The filler metal has a lower melting point than the adjoining metal or substrate. An applying step 830 applies a bond coat 570 to the brazing tape/preform. The bond coat 570 may cover the ceramic members 250 as well as the filler metal layer 230. After step 830, a second applying step 840 applies a thermal barrier coating 680 onto the bond coat 570. The TBC layer 680 covers the bond coat 570 and the ceramic members 250. A removing step 850 removes the ceramic members 250 by exposing the ceramic members 250 to a ceramic solvent. If the ceramic members 250 are water soluble, then water may be used to remove the ceramic members. Step 850 may be repeated until the ceramic members are sufficiently removed/dissolved. The voids or channels left by the now removed ceramic members form the micro channels 790.

An advantage provided by the present invention in that micro channels can be formed in thermal barrier coatings, without affecting or damaging the substrate. Thermal barrier coatings having micro channels have improved heat dissipation, and when the micro channels are connected to a cooling circuit even greater TBC performance may be achieved.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A method of forming micro channels in a thermal barrier coating, the method comprising:
   placing a brazing tape on a substrate, the brazing tape having a first side and a second side with a plurality of water-soluble ceramic members attached thereto, the first side is placed in contact with the substrate;
   brazing the brazing tape to the substrate;
   applying a bond coat to the second side of the brazing tape;
   applying a thermal barrier coating (TBC) onto the bond coat;

removing the plurality of water-soluble ceramic members by exposing the plurality of water-soluble ceramic members to a ceramic solvent comprised of water; and wherein a plurality of micro channels are formed in the thermal barrier coating by voids left from the plurality of water-soluble ceramic members, and wherein the plurality of water-soluble ceramic members comprise, about 60% to about 70% by weight of alumina (Al2O3), about 15% to about 25% by weight of zircon (ZrSiO4) flour, about 5% to about 15% by weight of sodium hydrogen phosphate (Na2HPO4), and about 5% by weight of sugar.

2. The method of claim 1, the brazing tape comprised of a material, the material selected from the group comprising:
nickel, nickel alloys, cobalt, cobalt alloys, iron, iron alloys, and combinations thereof.

3. The method of claim 1, the substrate selected from the group comprising:
a turbomachine part, a blade, a nozzle, a shroud and a transition piece.

4. The method of claim 1, the substrate comprised of a material, the material selected from the group comprising:
a superalloy, a nickel-based superalloy, and a cobalt-based superalloy.

5. The method of claim 1, the bond coat comprised of a material, the material selected from the group comprising:
aluminide, platinum aluminide (PtAl), cobalt-cermet, NiAl, MCrAlY, nickel alloys, nickel-chromium, cobalt alloys, aluminum alloys, and combinations thereof.

6. The method of claim 1, the thermal barrier coating (TBC) comprised of a material, the material selected from the group comprising:
a refractory-oxide ceramic, $ZrO_2$, yttrium-stabilized zirconia (YSZ), and combinations thereof.

7. A method of forming micro channels in a thermal barrier coating, the method comprising:
placing a brazing preform on a substrate, the brazing preform having a first side and a second side with a plurality of water-soluble ceramic members attached thereto, the first side is placed in contact with the substrate;
brazing the brazing tape to the substrate;
applying a bond coat to the brazing tape;
applying a thermal barrier coating (TBC) onto the bond coat;
removing the plurality of water-soluble ceramic members by exposing the plurality of water-soluble ceramic members to water; and wherein a plurality of micro channels are formed in the thermal barrier coating by voids left from the plurality of water-soluble ceramic members, and wherein the plurality of water-soluble ceramic members comprise, about 60% to about 70% by weight of alumina (Al2O3), about 15% to about 25% by weight of zircon (ZrSiO4) flour, about 5% to about 15% by weight of sodium hydrogen phosphate (Na2HPO4), and about 5% by weight of sugar.

8. The method of claim 7, the brazing tape comprised of a material, the material selected from the group comprising:
nickel, nickel alloys, cobalt, cobalt alloys, iron, iron alloys, and combinations thereof.

9. The method of claim 8, the bond coat comprised of a bond coat material, the bond coat material selected from the group comprising:
aluminide, platinum aluminide (PtAl), cobalt-cermet, NiAl, MCrAlY, nickel alloys, nickel-chromium, cobalt alloys, aluminum alloys, and combinations thereof.

10. The method of claim 9, the thermal barrier coating (TBC) comprised of a TBC material, the TBC material selected from the group comprising:
a refractory-oxide ceramic, $ZrO_2$, yttrium-stabilized zirconia (YSZ), and combinations thereof.

11. The method of claim 10, the substrate selected from the group comprising:
a turbomachine part, a blade, a nozzle, a shroud and a transition piece.

12. The method of claim 11, the substrate comprised of a substrate material, the substrate material selected from the group comprising:
a superalloy, a nickel-based superalloy, and a cobalt-based superalloy.

* * * * *